United States Patent
Lasserre et al.

(10) Patent No.: US 10,003,809 B2
(45) Date of Patent: Jun. 19, 2018

(54) METHOD AND DEVICE FOR TONE-MAPPING A HIGH DYNAMIC RANGE IMAGE

(71) Applicant: THOMSON LICENSING, Issy les Moulineaux (FR)

(72) Inventors: Sebastien Lasserre, Thorigné Fouillard (FR); Yannick Olivier, Thorigne Fouillard (FR); Fabrice Le Leannec, Mouaze (FR); David Touze, Rennes (FR)

(73) Assignee: THOMSON Licensing, Issy-les-Moulineaux (FR)

( * ) Notice: Subject to any disclaimer, the term of this patent is extended or adjusted under 35 U.S.C. 154(b) by 41 days.

(21) Appl. No.: 15/108,561

(22) PCT Filed: Dec. 22, 2014

(86) PCT No.: PCT/EP2014/079025
§ 371 (c)(1),
(2) Date: Jun. 27, 2016

(87) PCT Pub. No.: WO2015/097168
PCT Pub. Date: Jul. 2, 2015

(65) Prior Publication Data
US 2016/0345017 A1    Nov. 24, 2016

(30) Foreign Application Priority Data
Dec. 27, 2013    (EP) .................................. 13306886

(51) Int. Cl.
*H04N 19/30*    (2014.01)
*G09G 3/34*    (2006.01)
*G06F 3/14*    (2006.01)

(52) U.S. Cl.
CPC .......... *H04N 19/30* (2014.11); *G09G 3/3406* (2013.01); *G06F 3/14* (2013.01);
(Continued)

(58) Field of Classification Search
CPC .......... G06T 2207/20208; G06T 5/007; G09G 2320/027; G09G 2360/144;
(Continued)

(56) References Cited

U.S. PATENT DOCUMENTS

2004/0008267 A1    1/2004    Chen et al.
2005/0248524 A1*    11/2005    Feng .................... G09G 3/3413
                                                                   345/102
(Continued)

FOREIGN PATENT DOCUMENTS

CN    103295194    9/2013
EP    2375383    10/2011
(Continued)

OTHER PUBLICATIONS

Lee et al., "Local Tone Mapping Using Luminance Compression and Adaptive Color Saturation Control Parameter", 2011 IEEE 15th International Symposium on Consumer Electronics, Singapore, Singapore, Jun. 14, 2011, pp. 83-88.
(Continued)

*Primary Examiner* — Priyank Shah
(74) *Attorney, Agent, or Firm* — Brian J. Dorini; Xiaoan Lu

(57) ABSTRACT

The present invention generally relates to a method and device for tone-mapping an image. The method is characterized in that it comprises: obtaining (12) a residual image by dividing the image by a backlight image determined (11) from the image, and obtaining (13) a tone-mapped image by tone-mapping to the residual image.

19 Claims, 1 Drawing Sheet

(52) U.S. Cl.
CPC ........... *G09G 2320/066* (2013.01); *G09G 2320/0646* (2013.01); *G09G 2340/02* (2013.01)

(58) Field of Classification Search
CPC ... G09G 2320/0613; G09G 2320/0626; G09G 2320/066; G09G 2320/0238; G09G 2320/0233; H04N 9/68; H04N 19/98
See application file for complete search history.

(56) References Cited

U.S. PATENT DOCUMENTS

| | | |
|---|---|---|
| 2007/0285382 A1 | 12/2007 | Feng |
| 2010/0046612 A1 | 2/2010 | Sun et al. |
| 2011/0193896 A1 | 8/2011 | Johnson |
| 2011/0194618 A1* | 8/2011 | Gish .............. G06T 5/50 375/240.25 |
| 2011/0291919 A1* | 12/2011 | Kerofsky .......... G09G 3/3406 345/102 |
| 2013/0071022 A1 | 3/2013 | Jia et al. |
| 2013/0100178 A1* | 4/2013 | Ninan ............. G06T 5/009 345/690 |
| 2014/0210847 A1* | 7/2014 | Knibbeler ......... G09G 5/006 345/589 |

FOREIGN PATENT DOCUMENTS

| | | |
|---|---|---|
| WO | WO2011163114 | 12/2011 |
| WO | WO2014025588 | 2/2014 |

OTHER PUBLICATIONS

Boitard et al., "Temporal Coherency in Video Tone Mapping, A Survey", HDRi2013—First International Conference and SME Workshop on HDR Imaging, 2013, pp. 1-6.

Reinhard et al., "Photographic Tone Reproduction for Digital Images", ACM Transactions on Graphics, vol. 21, No. 3, May 2002, pp. 1-10.

Firas et al., "High Throughput JPEG2000 Compatible Encoder for High Dynamic Range Images", IEEE International Conference on Image Processing, San Diego, California, USA, Oct. 12, 2008, pp. 1424-1427.

Shiau et al., "High Dynamic Range Image Rendering With Order-Statistics Filter", IEEE International Conference on Genetic and Evolutionary Computing, Kitakyushu, Japan, Aug. 25, 2012, pp. 352-355.

Takao et al., "New Local Tone Mapping and Two-Layer Coding for HDR Images", 2012 IEEE International Conference on Acoustics, Speech and Signal Processing, Kyoto, Japan, Mar. 25, 2012, pp. 765-768.

Touze et al., "HDR Video Coding based on Local LDR Quantization", HDRi2014—Second International Conference and SME Workshop on HDR imaging, Mar. 4, 2014, pp. 1-6.

Salih et al., "Tone Mapping of HDR images: A review", IEEE International Conference on Intelligent and Advanced Systems, Kuala Lumpur, Malaysia, Jun. 12, 2012, pp. 368-373.

Mantiuk, R., "Multidimensional retargeting: Tone Mapping", ACM Siggraph ASIA 2011 Courses: Multidimensional image Retargeting, Hong Kong, Dec. 1, 2011, pp. 1-75.

Takao et al., "High Contrast HDR Video Tone Mapping Based on Gamma Curves", Institute of Electronics, Information and Communications Engineers Transactions on Fundamentals of Electronics, Communications and Computer Sciences, vol. E94A, No. 2, Feb. 2011, pp. 525-532.

Touze et al., "High Dynamic Range Video Distribution Using Existing Video Codecs", 2013 Picture Coding Symposium (PCS), San Jose, California, USA, Dec. 8, 2013, pp. 349-352.

Boitard et al.—"Impact of temporal coherence-based tone mapping on video compression"—2013 Proceedings of the 21st European Signal Processing Conference (EUSIPCO)—Sep. 9-13, 2013—IEEE.

\* cited by examiner

METHOD AND DEVICE FOR TONE-MAPPING A HIGH DYNAMIC RANGE IMAGE

This application claims the benefit, under 35 U.S.C. § 365 of International Application of PCT/EP14/079025, filed Dec. 22, 2014, which was published in accordance with PCT Article 21(2) on Jul. 2, 2015, in English, and which claims the benefit of European patent application No. 13306886.6, filed Dec. 27, 2013.

1. FIELD OF INVENTION

The present invention generally relates to image/video tone-mapping. In particular, the technical field of the present invention is related to tone-mapping of an image whose pixels values belong to a high-dynamic range.

2. TECHNICAL BACKGROUND

The present section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Low-Dynamic-Range images (LDR images) are images whose luminance values are represented with a limited number of bits (most often 8 or 10). This limited representation does not allow correct rendering of small signal variations, in particular in dark and bright luminance ranges. In high-dynamic range images (HDR images), the signal representation is extended in order to maintain a high accuracy of the signal over its entire range. In HDR images, pixel values are usually represented in floating-point format (either 32-bit or 16-bit for each component, namely float or half-float), the most popular format being openEXR half-float format (16-bit per RGB component, i.e. 48 bits per pixel) or in integers with a long representation, typically at least 16 bits.

The problem to be solved by the invention is to provide an automatic or semi-automatic method for tone-mapping a HDR image into a LDR image or, by extension, a sequence of HDR images into a sequence of LDR images because the method is applied image per image.

Tone-mapping methods are useful, for example, to view a HDR image on a traditional LDR-compatible display or in a dual color-grading approach which performs usually in a broadcast scenario.

Typically, a dual color-grading approach comprises capturing a HDR image (or sequence of images), color-grading the captured HDR image and tone-mapping the HDR image into a LDR image which is then color-graded.

As a matter of fact, because a tone-mapped LDR image is intended to be display, it must fulfil the basics of a viewable LDR scene compliant with the underlined HDR scene. In other words, the tone-mapping must preserve at least the spatial coherence into the tone-mapped image, the temporal coherence between multiple tone-mapped images of a sequence of images, the global luminance coherence, i.e. dark HDR scenes lead to dark LDR scenes and vice-versa, and the color coherence between an HDR image and a tone-mapped image i.e. the color-grading is preserved as much as possible.

A dual color-grading approach leads to the highest quality for a LDR image as it is produced under the control of an expert in color-grading, thus ensuring the absence of uncontrolled undesired effect of automatic and systematic methods. However, it takes the double post-production resources as one has to deal with two workflows, one for HDR and one for LDR.

It may not be practical for all use cases and it may the case that only the HDR sequence has been color-graded. Of course, in such a case, it is desirable to obtain a viewable LDR image because not all customers may be equipped with HDR devices for displaying. In order to reach these customers, a LDR image must be produced without extra or alternative color-grading, i.e. by using an automatic tone-mapping method providing LDR images with an acceptable quality for all contents.

Many local or global tone-mapping operators exist in the prior art such as, for example, the tone-mapping operator defined by Reinhard may be used (Reinhard, E., Stark, M., Shirley, P., and Ferwerda, J., *Photographic tone reproduction for digital images,*" ACM Transactions on Graphics 21 (July 2002)), or Boitard, R., Bouatouch, K., Cozot, R., Thoreau, D., & Gruson, A. (2012). Temporal coherency for video tone mapping. In A. M. J. van Eijk, C. C. Davis, S. M. Hammel, & A. K. Majumdar (Eds.), *Proc. SPIE* 8499, *Applications of Digital Image Processing* (p. 84990D-84990D-10)).

However, even if global tone-mapping operators preserve temporal properties over a sequence of images such as the brightness consistency, global tone-mapping operators may fail dramatically when applied to sequences of HDR images with a lot of dynamic as such operators are unable to represent the spatial details on a lower dynamic without a noticeable loss of sharpness.

On the other hand, local tone-mapping operators are not efficient when dealing with sequences of images because they are based on local pixel neighborhood to capture local properties of an image and do not preserve the overall brightness of a sequence of images (temporal brightness consistency). As a consequence, temporal brightness consistency is obtained by using additional complex processing such as object tracking or frame buffering in order to apply temporal filtering.

3. SUMMARY OF THE INVENTION

The invention sets out to remedy some of the drawbacks of the prior art with a method for tone-mapping an image, characterized in that it comprises:
  obtaining a residual image by dividing the image by a backlight image determined from the image, and
  obtaining a tone-mapped image by tone-mapping the residual image.

This provides a tone-mapped image which is viewable, i.e. an image in the sense that the tone-mapped image renders artistically the tone-mapped scene reasonably well and consistently compared to the original scene in the image. This method is thus backward compatible because the viewable tone-mapped image may be encoded/decoded and/or displayed by a traditional apparatus which is not able to handle high dynamic range.

According to an embodiment, the tone-mapping comprises either a gamma- or Slog-correction according to the pixel values of the residual image.

Gamma and SLog corrections, such that there is no loss of dark and bright information, lead to a tone-mapped image with high precision. Moreover, gamma and S-log correction avoid flat clipped areas in the viewable tone-mapped image.

According to an embodiment, obtaining the backlight image from the image comprises:

obtaining a backlight image from a luminance component of the image; and modulating the backlight image with a mean luminance value of the image.

Modulating the backlight image with a mean luminance value of the image improves the global luminance coherence between the image and the residual image, e.g. a bright region in the image appears bright in the residual image and a dark region in the image appears dark in the residual image.

According to an embodiment, obtaining the backlight image from the image further comprises:

normalizing the backlight image by its mean value before modulating the backlight image.

This allows to get a mid-gray-at-one backlight image for the image.

According to an embodiment, the method further comprises scaling of the tone-mapped image.

This put the mean gray of an image obtained from the tone-mapped image at an adequate value for both viewing and potentially for coding.

According to an embodiment, the method further comprises clipping the tone-mapped image.

Clipping the tone-mapped image ensures a backward compatibility with traditional infrastructure (codec, displays, distribution channels, etc.) because a limited number of bits, typically 8-10 bits, is required to encode or to display the clipped tone-mapped image. Then, for example, the encoded data may be transmitted over such infrastructure to display a low dynamic range version of the image on a remote display.

According to another of its aspects, the invention relates to a device for tone-mapping an image.

The specific nature of the invention as well as other objects, advantages, features and uses of the invention will become evident from the following description of a preferred embodiment taken in conjunction with the accompanying drawings.

4. LIST OF FIGURES

The embodiments will be described with reference to the following figures.

5. DETAILED DESCRIPTION OF A PREFERRED EMBODIMENT OF THE INVENTION

Figure 1:
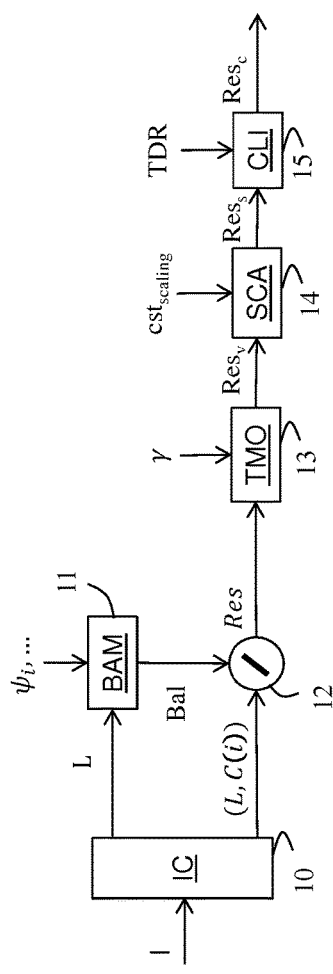
FIG. 1 shows a block diagram of the steps of a method for tone-mapping an image I in accordance with an embodiment of the invention.

The present invention will be described more fully hereinafter with reference to the accompanying figures, in which embodiments of the invention are shown. This invention may, however, be embodied in many alternate forms and should not be construed as limited to the embodiments set forth herein. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Although some of the diagrams include arrows on communication paths to show a primary direction of communication, it is to be understood that communication may occur in the opposite direction to the depicted arrows.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "one embodiment" or "an embodiment" means that a particular feature, structure, or characteristic described in connection with the embodiment can be included in at least one implementation of the invention. The appearances of the phrase "in one embodiment" or "according to an embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

While not explicitly described, the present embodiments and variants may be employed in any combination or sub-combination.

The invention is described for encoding/decoding an image but extends to the encoding/decoding of a sequence of images (video) because each image of the sequence is sequentially encoded/decoded as described below.

FIG. 1 shows a block diagram of the steps of a method for tone-mapping an image I in accordance with an embodiment of the invention.

In step 10, a module IC obtains the luminance component L and potentially at least one color component C(i) of the image I to be tone-mapped.

For example, when the image I belongs to the color space (X,Y,Z), the luminance component L is obtained by a transform f(.) of the component Y, e.g. L=f(Y).

When the image I belongs to the color space (R,G,B), the luminance component L is obtained, for instance in the 709 gamut, by a linear combination which is given by:

$$L = 0.2127 \cdot R + 0.7152 \cdot G + 0.0722 \cdot B$$

In step 11, a module BAM determines a backlight image BaI from the luminance component L of the image I.

Figure 2:
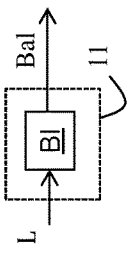
FIG. 2 shows a block diagram of a step of the method in accordance with an embodiment of the invention.

According to an embodiment of the step 11, illustrated in FIG. 2, a module BI determines a backlight image Ba as being a weighted linear combination of shape functions $\psi_i$ given by:

$$Ba = \Sigma_i a_i \psi_i \quad (1)$$

with $a_i$ being weighting coefficients.

Thus, obtaining the backlight image Ba from a luminance component L consists in finding the optimal weighting coefficients (and potentially also the optimal shape functions if not known beforehand) in order that the backlight image Ba fits the luminance component L.

There are many well-known methods to find the weighting coefficients $a_i$. For example, one may use a least mean square method to minimize the mean square error between the backlight image Ba and the luminance component L.

The invention is not limited to any specific method to obtain the backlight image Ba.

It may be noted that the shape functions may be the true physical response of a display backlight (made of LED's for instance, each shape function then corresponding to the response of one LED) or may be a pure mathematical construction in order to fit the luminance component at best.

The size of their supports and their centers may be some parameters of the shape functions.

For example, if their support is very large (virtually infinite), then one just gets a constant backlight image and the resulting tone-mapping method is then equivalent to a global tone-mapping operator. At the opposite, with very small supports, the resulting tone-mapping method is then equivalent to a local tone-mapping operator with all the drawbacks of local tone-mapping operators as described above.

The size of the support of the shape functions is chosen, in practice, in order to get a tone-mapping method which is neither global nor very local as it uses smooth luminance dynamic reduction which is local but with a large neighborhood.

The use of such shape functions allows dealing with very high dynamic while not sacrificing spatial details because of their local support.

According to this embodiment, the backlight image BaI, output from step 11, is the backlight image Ba given by equation (1).

Figure 3:
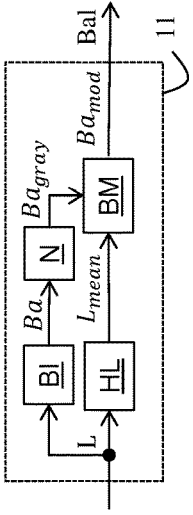
FIG. 3 shows a block diagram of a step of the method in accordance with an embodiment of the invention.

According to an embodiment of the step 11, illustrated in FIG. 3, a module BM modulates the backlight image Ba (given by equation (1)) with a mean luminance value $L_{mean}$ of the image I obtained by the means of a module HL.

According to this embodiment, the backlight image BaI, output from step 11, is the modulated backlight image.

According to an embodiment, the module HL is configured to calculate the mean luminance value $L_{mean}$ over the whole luminance component L.

According to an embodiment, the module HL is configured to calculate the mean luminance value $L_{mean}$ by $$L_{mean} = E(L^\beta)^{\frac{1}{\beta}}$$

with $\beta$ being a coefficient less than 1 and E(X) the mathematical expectation value (mean) of the luminance component L.

This last embodiment is advantageous because it avoids that the mean luminance value $L_{mean}$ be influenced by a few pixels with extreme high values which usually leads to very annoying temporal mean brightness instability when the image I belongs to a sequence of images.

The invention is not limited to a specific embodiment for calculating the mean luminance value $L_{mean}$.

Figure 4:
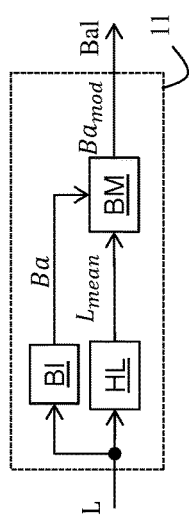
FIG. 4 shows a block diagram of a step of the method in accordance with an embodiment of the invention.

According to a variant of this embodiment, illustrated in FIG. 4, a module N normalizes the backlight image Ba (given by equation (1)) by its mean value E(Ba) such that one gets a mid-gray-at-one backlight image $Ba_{gray}$ for the image (or for all images if the image I belongs to a sequence of images):

$$Ba_{gray} = \frac{Ba}{E(Ba)}$$

Then, the module BM is configured to modulate the mid-gray-at-one backlight image $Ba_{gray}$ with the low-spatial-frequency version $L_{lf}$ of the image L, by using the following equation:

$$Ba_{mod} \approx cst_{mod} \cdot L_{lf}^a \cdot Ba_{gray} \quad (2)$$

with $cst_{mod}$ being a modulation coefficient and a being another modulation coefficient less than 1, typically ⅓.

According to this variant, the backlight image BaI, output from step 11, is the modulated backlight image $Ba_{mod}$ given by equation (2).

It may be noted that the modulation coefficient $cst_{mod}$ is tuned to get a good looking brightness for the residual image and highly depends on the process to obtain the backlight image. For example, $cst_{mod} \approx 1.7$ for a backlight image obtained by least means squares.

Practically, by linearity, all operations to modulate the backlight image apply to the backlight coefficients $a_i$ as a correcting factor which transforms the coefficients $a_i$ into new coefficients $\tilde{a}_i$ such that one gets $$Ba_{mod} = \sum_i \tilde{a}_i \psi_i$$

In step 12, a residual image Res is calculated by dividing the image by the backlight image BaI.

More precisely, the luminance component L and potentially each colour component C(i) of the image I, obtained from the module IC, is divided by the backlight image BaI. This division is done pixel per pixel.

For example, when the components R, G or B of the image I are expressed in the color space (R,G,B), the component $R_{Res}$, $G_{Res}$ and $B_{Res}$ are obtained as follows:

$$R_{res}=R/BaI, G_{res}=G/BaI, B_{res}=B/BaI,$$

For example, when the components X, Y or Z of the image I are expressed in the color space (Y,Y,Z), the component $X_{Res}$, $Y_{Res}$ and $Z_{Res}$ are obtained as follows:

$$X_{res}=X/BaI \ Y_{res}=Y/BaI \ Z_{res}=Z/BaI$$

In step 13, a tone-mapped image $Res_v$ is obtained by tone-mapping the residual image Res.

It may appear that the residual image Res may not be viewable because its dynamic range is too high and because this residual image Res shows too visible artifacts. Tone-mapping the residual image remedies to at least one of these drawbacks.

The invention is not limited to any specific tone-mapping operator.

Advantageously, the tone-mapping operator shall be reversible in order to allow the reconstruction of the original HDR image.

According to an embodiment of the step 13, tone-mapping the residual image comprises either a gamma- or a SLog-correction according to the pixel values of the residual image.

The tone-mapped image $Res_v$ is then given, for example, by:

$$Res_v = A \cdot Res^\gamma$$

with A being a constant value, $\gamma$ being a coefficient of a gamma curve equal, for example, to 1/2.4.

Alternatively, the tone-mapped image $Res_v$ is given, for example, by:

$$Res_v = a \cdot \ln(Res+b) + c$$

with a, b and c being coefficients of a SLog curve determined such that 0 and 1 are invariant, and the derivative of the SLog curve is continuous in 1 when prolonged by a gamma curve below 1. Thus, a, b and c are functions of the parameter $\gamma$.

Applying a gamma correction on the residual image Res, pulls up the dark regions but does not lower enough high lights to avoid burning of bright pixels.

Applying a SLog correction on the residual image Res lowers enough high lights but does not pull up the dark regions.

Then, according to an embodiment of the step 13, the module TMO applies either the gamma correction or the SLog correction according to the pixel values of the residual image Res.

For example, when the pixel value of the residual image Res is below a threshold (equal to 1), then the gamma correction is applied and otherwise the SLog correction is applied.

By construction, the tone-mapped image $Res_v$ usually has a mean value more or less close to 1 depending on the brightness of the image I, making the use of the above gamma-Slog combination particularly efficient.

According to an embodiment of the method, in step 14, a module SCA scales the tone-mapped image $Res_v$ by multiplying each component of the tone-mapped image $Res_v$ by a scaling factor $cst_{scaling}$.

The scaled-tone-mapped image $Res_s$ is then given by $$Res_s = cst_{scaling} \cdot Res_v$$

Preferably, the scaling factor $cst_{scaling}$ is defined to map the values of the tone-mapped image $Res_v$ between from 0 to the maximum value $2^N-1$, where N is the number of bits allowed, for example, as input for the coding by an encoder or a display.

This is naturally obtained by mapping the value 1 (which is roughly the mean value of the tone-mapped image $Res_v$) to the mid-gray value $2^{N-1}$. Thus, for a tone-mapped image $Res_v$ with a standard number of bits N=8, a scaling factor equal to 120 is a very consistent value because very closed to the neutral gray at $2^7=128$.

According to an embodiment of the method, in step 15, a module CLI clips the tone-mapped image $Res_v$ to limit its dynamic range to a targeted dynamic range TDR which is defined, for example, according to the capabilities of an encoder or a display.

According to this last embodiment, the resulting residual image $Res_c$ is given, for example, by:

$$Res_c = \max(2^N, Res_v)$$

$$Res_c = \max(2^N, Res_s)$$

according to the embodiments of the method.

The invention is not limited to such clipping (max(.)) but extends to any other clipping.

Combining the scaling and clipping embodiments leads to a residual image $Res_{sc}$ given by:

$$Res_{sc} = \max(2^N, cst_{scaling} * Res_v)$$

or by $Res_{sc} = \max(2^N, cst_{scaling} * Res_s)$ according to the embodiments of the method.

The tone-mapping, scaling and clipping described above are parametric processes. The parameters may be fixed or not and in the latter case, the parameters, or some of them, may be encoded in a bitstream by means of an encoder and/or transmitted to a remote display and/or obtained from a local or remote memory.

It may be noted that the choice of the parameters, for example, $\alpha$, $cst_{mod}$, $cst_{scaling}$, $\gamma$, $\beta$ gives room for the choice of the tone-mapping which suits the content the best following the taste of an expert in post-production and color grading. Also, the position and the size of the shape functions used to generate the backlight are other parameters which may be chosen.

On the other hand, universal parameters may be defined in order to be acceptable for all of a large variety of images. This leads to a fully automatic tone-mapping, by opposition to a semi-automatic parametric tone-mapping when the parameters described above are chosen by an end-user or any other local or external means.

On FIG. 1-4, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the invention are implemented using either pure hardware, for example using dedicated hardware such ASIC or FPGA or VLSI, respectively « Application Specific Integrated Circuit », « Field-Programmable Gate Array », « Very Large Scale Integration », or from several integrated electronic components embedded in a device or from a blend of hardware and software components.

Figure 5:
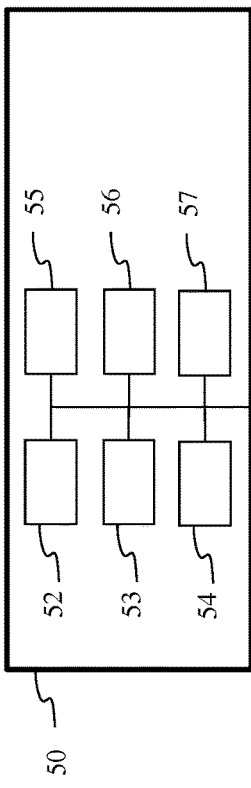
FIG. 5 shows an example of an architecture of a device.

FIG. 5 represents an exemplary architecture of a device 50 which may be configured to implement a method described in relation with FIGS. 1 to 4.

Device 50 comprises following elements that are linked together by a data and address bus 51:
- a microprocessor 52 (or CPU), which is, for example, a DSP (or Digital Signal Processor);
- a ROM (or Read Only Memory) 53;
- a RAM (or Random Access Memory) 54;
- an I/O interface 55 for reception of data to transmit, from an application; and
- a battery 56

According to a variant, the battery 56 is external to the device. Each of these elements of FIG. 5 are well-known by those skilled in the art and won't be disclosed further. In each of mentioned memory, the word « register » used in the specification can correspond to area of small capacity (some bits) or to very large area (e.g. a whole program or large amount of received or decoded data). ROM 53 comprises at least a program and parameters. Algorithm of the methods according to the invention is stored in the ROM 53. When switched on, the CPU 52 uploads the program in the RAM and executes the corresponding instructions.

RAM 54 comprises, in a register, the program executed by the CPU 52 and uploaded after switch on of the device 50, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

According to an embodiment, the I/O interface 55 is configured to receive at least one of the parameters which are used by a method described in relation with FIG. 1-4. For example, the parameters are limited to the weighting coefficients $\alpha_i$ or $\bar{\alpha}_i$, when known non-adaptive shape functions are used but the shape functions $\Psi_i$ may also be a priori unknown, for instance in a case of a somewhat optimal mathematical construction for better fitting. Then, the size of the support and the position of the shape functions $\Psi_i$ may then be parameters. The coefficient $\gamma$ of a gamma curve, $\beta$, $cst_{mod}$, $\alpha$, the scaling factor $cst_{scaling}$, the number of bits N, may also be parameters of the method for tone-mapping an image in accordance with the invention.

Some of these parameters may be obtained from a local or remote memory or selected by an end-user from a graphical interface of the device 50. The tone-mapping method may thus be automatic or semi-automatic according to the way used to obtain the parameters of this method.

Some of these received parameters may have been encoded by a remote device. Then, the device 50 comprises a decoder to decode these received parameters.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:
obtaining a residual image by dividing an image by a backlight image determined from a luminance component of the image; and
obtaining a tone-mapped image by tone-mapping the residual image and by modulating the backlight image with a mean luminance value, $L_{mean}$, of the image according to $L_{mean}=E(L^\beta)^{1/\beta}$, with β being a coefficient less than 1 and E( ) the mathematical expectation value of the luminance component L.

2. The method according to claim 1, wherein tone-mapping the residual image comprises applying either a gamma- or Slog-correction to pixel values of the residual image.

3. The method according to claim 1, further comprising:
normalizing the backlight image by its mean value before modulating the backlight image.

4. The method according to claim 1, wherein the method further comprises scaling the tone-mapped residual image.

5. The method according to claim 1, wherein the method further comprises clipping the tone-mapped residual image.

6. A device for tone-mapping an image comprising at least one processor configured for:
obtaining a residual image by dividing the image by a backlight image determined from a luminance component of the image, and
obtaining a tone-mapped image by tone-mapping the residual image and by modulating the backlight image with a mean luminance value, $L_{mean}$, of the image according to $L_{mean}=E(L^\beta)^{1/\beta}$, with β being a coefficient less than 1 and E( ) the mathematical expectation value of the luminance component L.

7. A computer program product, comprising instructions of program code for executing steps of the method according to claim 1, when said program is executed on a computing device.

8. A non-transitory storage medium carrying instructions of program code for executing steps of the method according to claim 1, when said program is executed on a computing device.

9. The method according to claim 1, further comprising determining shape functions and weighting coefficients of a linear combination of the shape functions such that the linear combination represents said backlight image.

10. The method of claim 9, wherein said linear combination fits said luminance component.

11. The method of claim 9, wherein said shape functions correspond to the response of a display backlight.

12. The device of claim 6, wherein the at least one processor is further configured for tone-mapping the residual image by applying either a gamma- or Slog-correction to the pixel values of the residual image.

13. The device of claim 6, wherein the at least one processor is further configured for determining shape functions and weighting coefficients of a linear combination of these shape functions such that the linear combination represents said backlight image.

14. The device of claim 13, wherein said shape functions fits said luminance component.

15. The device of claim 13, wherein said shape functions correspond to the response of a display backlight.

16. An electronic equipment incorporating the device of claim 6.

17. The electronic equipment of claim 16 chosen in the group consisting of a video encoder, a video decoder, a set-top box, a laptop, a personal computer, a cell phone and a PDA.

18. A computer program product, comprising instructions of program code for executing steps of the method according to claim 9, when said program is executed on a computing device.

19. A non-transitory storage medium carrying instructions of program code for executing steps of the method according to claim 13, when said program is executed on a computing device.

* * * * *